(12) United States Patent
DiMaio (10) Patent No.: US 8,491,815 B1
(45) Date of Patent: Jul. 23, 2013

(54) OMNINO NANOCOMPOSITE CROSSLINKED NETWORKS

(76) Inventor: Jeffrey R. DiMaio, Seneca, SC (US)

( * ) Notice: Subject to any disclaimer, the term of this patent is extended or adjusted under 35 U.S.C. 154(b) by 889 days.

(21) Appl. No.: 12/366,701

(22) Filed: Feb. 6, 2009

Related U.S. Application Data (60) Provisional application No. 61/026,848, filed on Feb. 7, 2008.

(51) Int. Cl.
  *C09K 11/02* (2006.01)
  *C09K 11/08* (2006.01)
  *C09K 11/77* (2006.01)

(52) U.S. Cl.
  USPC .............................. 252/301.36; 252/301.4 R (58) Field of Classification Search
  USPC ...................................... 252/301.36, 301.4 R
  See application file for complete search history.

(56) References Cited

U.S. PATENT DOCUMENTS

| | | | |
|---|---|---|---|
| 6,593,392 B2 | 7/2003 | Wang et al. | |
| 6,599,631 B2 * | 7/2003 | Kambe et al. | ................. 428/447 |
| 6,627,314 B2 | 9/2003 | Matyjaszewski et al. | |
| 6,649,715 B1 | 11/2003 | Smith et al. | |
| 6,664,315 B2 | 12/2003 | Tomalia et al. | |
| 6,699,406 B2 | 3/2004 | Riman et al. | |
| 6,710,366 B1 | 3/2004 | Lee et al. | |
| 6,794,265 B2 | 9/2004 | Lee et al. | |
| 6,819,845 B2 | 11/2004 | Lee et al. | |
| 6,881,490 B2 | 4/2005 | Kambe et al. | |
| 6,918,946 B2 | 7/2005 | Korgel et al. | |
| 6,953,653 B2 | 10/2005 | Smith et al. | |
| 7,005,669 B1 | 2/2006 | Lee | |
| 7,019,082 B2 | 3/2006 | Matyjaszewski et al. | |
| 7,020,372 B2 | 3/2006 | Lee et al. | |
| 7,094,361 B2 | 8/2006 | Riman et al. | |
| 7,094,441 B2 | 8/2006 | Chittibabu et al. | |
| 7,110,154 B2 | 9/2006 | Ballato et al. | |
| 7,226,966 B2 | 6/2007 | Kambe et al. | |
| 7,253,004 B2 | 8/2007 | Vossmeyer et al. | |
| 7,265,174 B2 | 9/2007 | Carroll et al. | |
| 7,524,746 B2 * | 4/2009 | Locascio et al. | ............... 438/584 |
| 7,767,260 B2 * | 8/2010 | Peng et al. | ..................... 427/214 |
| 2005/0201963 A1 | 9/2005 | Dutta | |
| 2006/0159923 A1 | 7/2006 | Becker-Willinger et al. | |
| 2007/0181302 A1 | 8/2007 | Bicerano | |
| 2007/0254981 A1 | 11/2007 | DiMaio et al. | |
| 2008/0105855 A1 | 5/2008 | Buretea et al. | |

OTHER PUBLICATIONS

Related US Patent Applications.

* cited by examiner

*Primary Examiner* — Emily Le
*Assistant Examiner* — Matthew E Hoban
(74) *Attorney, Agent, or Firm* — J. Bennett Mullinax, LLC (57) ABSTRACT

Disclosed are bulk, crosslinked nanocomposite networks that do not require a host polymer in the matrix. Bulk nanocomposites can be formed via derivatization of nanoparticles with functional ligands that directly or indirectly crosslink with one another or with nanostructures of the network to form a highly crosslinked network. Disclosed bulk nanocomposites can contain nanoscale materials at extremely high loading levels. Nanostructures incorporated in the networks can include optically active materials such as inorganic nanostructures doped with optically active rare earth ions.

9 Claims, 4 Drawing Sheets

OMNINO NANOCOMPOSITE CROSSLINKED NETWORKS

CROSS REFERENCE TO RELATED APPLICATION

The present application claims filing benefit of U.S. Provisional Patent Application Ser. No. 61/026,848 having a filing date of Feb. 7, 2008, which is incorporated herein in its entirety.

BACKGROUND OF THE INVENTION

Materials formed on a nanometer-sized scale are being developed that provide the potential for exciting advances in optics, electronics, and chemical processing, among other applications. For instance, rare earth doped nanocrystals are of particular interest in the field of optics as the emissions, e.g., lanthanide emissions, can have a narrow linewidth emission and can possess near unity quantum efficiency. Metallic nanoparticles can find use as scatterers in optical composites and can increase rare earth emissions, can create color due to localized surface plasmon resonances, and can increase surface enhanced Raman scattering (SERS) effectiveness.

However, in order to take advantage of the potential of nano-sized materials, they need to be provided for use on a macroscopic scale without loss of desirable characteristics and at a reasonable cost. For instance, bulk nanocomposite materials have been formed using one or more polymers to form a matrix that can then encapsulate or otherwise contain the nanostructures.

Utilization of polymers has been considered to be the most desirable route to providing bulk nanocomposites as polymers can be provided with a wide variety of characteristics and as such can be tailored for specific end-use products. For instance, a polymer can be chosen for a matrix that has a Hamaker constant close to that of the nanoparticles incorporated therein. The matching of the Hamaker constants normally coincides with the matching of refractive indices and can therefore ameliorate potential dispersion and scattering problems. In addition, polymers can be processed according to a wide variety of methods and conditions and as such can be bound to nanoparticles with any of a number of linking or bridging molecules. For example, U.S. Pat. No. 6,881,490 to Kambe, et al. describes composite materials including inorganic particles at a loading level up to about 50 weight percent in which the inorganic particles are bound to the polymers forming the network by a linker molecule. Similarly, U.S. Pat. No. 7,019,082 to Matyjaszewski, et al. teaches a soft polymer network that can incorporate nanomaterials into the matrix, for instance through use of multi-branched or 'hairy' polymers.

Unfortunately, formation of bulk nanocomposites based upon polymeric matrices has led to problems at the macroscopic scale. Specifically, in order to be effective and of practical use, bulk nanocomposites should not detract extensively from the desirable characteristics of the individual materials of the composite, but this is a common occurrence when considering bulk nanocomposites incorporating polymeric matrices. For instance, nanostructures such as quantum dots exhibit a rapid loss of efficiency upon formation of nanocomposites with loading levels greater than about 2% by weight, and formation of nanocomposites with high loading levels of nanostructures (e.g., greater than about 50% by weight) has proven extremely difficult. Moreover, even when high loading levels have been attained, nanostructures such as rare earth doped nanocrystals suffer from agglomeration at high loading levels in bulk composites, with agglomeration resulting in undesirable scattering of light in the composite.

Attempts have been made to overcome such problems. For instance, U.S. Pat. No. 6,593,392 to Wang describes silica nanoparticles that are smaller than the desired operating wavelength. These silica nanoparticles exhibit substantially no scattering loss when bound to a fluorinated silane coupling agent that is in turn bound to a halogenated solid polymer matrix.

What are needed in the art are bulk nanocomposite materials that maintain both good optical characteristics and good mechanical and processablity properties.

SUMMARY

According to one embodiment, disclosed are bulk nanocomposites comprising a plurality of optically active inorganic nanostructures linked to one another via short linking structures. For instance, each optically active inorganic nanostructure can include an optically active rare earth ion dopant. As desired, all of the nanostructures can include the same dopant, or different nanostructures can include different dopants. Nanostructures of a bulk composite can be core/shell optically active nanostructures. For instance, multilayer core/shell nanostructures including optically active rare earth dopants in different layers can be incorporated into disclosed composites.

In general, the nanostructures of disclosed bulk composites can be linked to one another via linking structures that include less than about 20 monomer units, or less than about 10 monomer units, in another embodiment. For example, a linking structure can include a first ligand of less than about 10 monomer units bonded to a second ligand of less than about 10 monomer units. Moreover, a linking structure can include a small molecule crosslinker.

According to another embodiment, disclosed are bulk nanocomposites comprising a first nanostructure and a second nanostructure linked to one another via a linking structure that includes a perfluorocyclobutyl (PFCB) group. A linking structure can include a short oligomer of less than about 10 monomer units between the PFCB group and each nanostructure on either side of the PFCB group. In one embodiment, the linking structure can include an aromatic group immediately adjacent to the PFCB group.

Nanostructures of a PFCB linkage-containing bulk composite can be optically active. For example, inorganic optically active nanostructures, optionally doped with an optically active rare earth dopant, optically active semiconductor nanostructures, and the like can be incorporated in a composite.

Also disclosed are methods for forming nanocomposites as described herein.

BRIEF DESCRIPTION OF FIGURES

A full and enabling description of the presently disclosed subject matter, including the best mode thereof, to one of ordinary skill in the art, is set forth more particularly in the remainder of the specification, including reference to the accompanying Figures, in which:

FIG. 2 compares the thermogravimetric analysis (TGA) of several different $LaF_3$-6F perfluorocyclobutane (PFCB)

materials, including disclosed omnino nanocomposites and traditional crosslinked polymer networks;

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made to the disclosed subject matter without departing from the scope or spirit of the disclosure. For instance, features illustrated or described as part of one embodiment, may be used with another embodiment to yield a still further embodiment.

In general, the present disclosure is directed to the formation of omnino nanocomposites. Omnino nanocomposites as disclosed herein have been termed as such as they can be formed entirely (Lat. omnino) of composite nanoparticles, with no additional polymer necessary in the formation of a crosslinked bulk matrix. Accordingly, disclosed bulk composite materials can include nanostructures at a very high loading rate, generally greater than about 50% by weight of the bulk material, or higher yet in other embodiments, for instance greater than 60% by weight, greater than 70% by weight, or greater than 80% by weight, in some embodiments.

The shape of nanostructures as may be incorporated in disclosed omnino nanocomposites may generally vary. In the embodiment illustrated in FIG. 1, for instance, the particle is spherical in shape. However, it should be understood that other shapes are also contemplated by the present disclosure, such as cubes, plates, rods, discs, bars, tubes, irregular shapes, etc. In addition, the size of the nanostructures may also vary. For instance, the average size (e.g., diameter) of the particles may range from about 1 nanometer (nm) to about 500 nm, and in some embodiments, from about 1 nm to about 100 nm, and in some embodiments, from about 1 nm to about 10 nm.

Nanostructures as may be incorporated in disclosed omnino nanocomposites can generally be formed of any material that can form particles on a nanometer scale and can be functionalized with a reactive ligand at a surface. In one preferred embodiment, nanostructures can exhibit desirable optical characteristics. For example, inorganic nanostructures can be utilized that have low phonon energy and can be doped with rare earth ion dopants. Thus, in one embodiment, a doped inorganic nanostructure may be incorporated in an omnino nanocomposite that can be specifically tuned to exhibit any of a wide range of emission wavelengths. Disclosed materials are not limited to doped inorganic nanostructures, however. Undoped inorganic nanostructures can be incorporated in an omnino nanocomposite as well, for instance for the purpose of passive performance increase in UV or IR transmission windows. For example, doped or undoped nanostructures of transition metal compounds such as lanthanum fluoride ($LaF_3$), scandium oxide ($Sc_2O_3$), yttrium oxide ($Y_2O_3$) or other known optical materials can be incorporated into disclosed bulk nanocomposites. In another embodiment, nanostructures based upon metals or metal oxides, such as silicon dioxide ($SiO_2$), for example, may be utilized.

A variety of semi-conductors can be utilized to form nanostructures. For example, nanostructures for use as disclosed herein can include doped or undoped semiconductor materials such as Group II-VI, IV-VI, or III-V semiconductor materials. Exemplary semiconductor nanoparticles can include, without limitation, CdS, ZnS, PbS, CdSe, ZnSe, PbSe, ZnTe, PbTe and CdTe nanoparticles. Ternary and quaternary semiconductor nanoparticles, such as CdZnS, CdZnSe, CdZnTe, CdZnTeSe and CdZnSSe, for example, can also be used. Semiconductor nanoparticles other than IV-VI or II-VI nanostructures may also be used including, for example, GaAs, GaP, GaN, InP, InAs, GaAlAs, GaAlP, GaAlN, GaInN, GaAlAsP, GaAlInN, and the like. To avoid quenching of semiconductor nanoparticles at high loading levels, combinations of these materials with passive particles such as SiO2 can be used.

In one embodiment, layered nanoparticles such as those described in U.S. Patent Application Publication No. 2007/0254981 to DiMaio, et al., which is incorporated herein by reference, may be utilized in forming disclosed omnino nanocomposite bulk materials. These complex core-shell particles can include a first optically active ion, e.g., a rare earth dopant, within an optically transparent base material, such as a halide salt, that is within a first layer of the nanoparticle and a second optically active ion within a second layer of the nanoparticle. For instance, the layered nanoparticle can be a core/shell nanoparticle. The relative locations of the two (or more) dopants to one another can allow for control of energy transfer among dopant ions within a single nanoparticle.

Through the predetermined location of the first layer and the second layer with respect to one another, energy transfer between the optically active ions can be controlled. For example, two layers including different optically active ions can be immediately adjacent to one another and the energy transfer between the ions can be large. In another embodiment, an optically passive layer can be located between the two layers. The thickness of this optically passive layer can control the amount of energy transfer between the two active ions that are separated by the passive layer. For instance, an optically passive layer can be located between two layers, each of which contain different optically active ions, and the energy transfer between the two optically active ions can be less than that of a co-doped particle, e.g., partial energy transfer. In another embodiment, one or more intervening layers can completely prevent energy transfer, i.e., zero energy transfer between the active ions. This enables a single nanoparticle to have multiple emissions across the spectrum. The size of these layered nanoparticles can generally be from about 1 nm to about 30 nm. For instance from about 1 nm to about 15 nm in another embodiment, or from about 5 nm to about 10 nm in another embodiment.

In accord with the disclosed subject matter, nanostructures can be functionalized with one or more ligands that can in turn be utilized to crosslink an omnino nanocomposite network. Thus, the composite nanoparticles themselves can be the composition of the bulk material, without the necessity of additional matrix materials, and specifically, additional polymers. Disclosed formation techniques and omnino nanocomposites formed thereby can solve problems associated with dispersion and scattering as has been found in previously known polymer-based matrices and can provide a route to high loading levels of nanoparticles in the bulk materials. Moreover, disclosed omnino nanocomposites can be quite stable, e.g., mechanically, thermally, and chemically stable, as well as having good processability.

In general, any ligand can be utilized that includes a head group that can bind the ligand to a core nanostructure and a terminal group that includes functionality for crosslinking the network. More specifically, a terminal group can be utilized to crosslink a network either through reaction with other ligands having the same or different terminal groups, with surface groups on other nanostructures, or with a crosslinking agent.

Ligands can in one embodiment be monomeric compounds. However, in some embodiments, oligomers can be utilized as ligands, e.g., dimers or trimers, but ligands will not be large polymers, i.e., they will not comprise more than about 10 repeating units along a backbone of a ligand.

The head group of a ligand may include any functionality which can bind to a nanostructure during a formation process and may also serve to disperse the nanoparticles and control particle size as is well known to those skilled in the art. A composite formation process can include the attachment of ligands to a pre-formed nanoparticle or alternatively, a single step formation process can be utilized in which a nanoparticle is synthesized in the presence of ligands leading to formation of a composite nanoparticle including ligands attached at a surface of the nanoparticle. By way of example, a composite nanoparticle can be synthesized in the presence of a ligand including a carboxylate headgroup that is formed by deprotonating the headgroup before the addition of nanoparticle precursors to a formation solution. Alternatively, composite nanoparticles can be formed in the presence of a ligand which is in a salt form, such as ammonia di-n-octadecyldithiophosphate. In yet another embodiment, one can perform a ligand exchange with preformed nanoparticles as is commonly done in other surface modified nanostructure applications.

Binding of a ligand to a nanostructure can be carried out via covalent or noncovalent bonding, e.g., ionic, hydrogen, or any other bond formation technique. For instance, the head group of a ligand can form a covalent bond with a dangling reactive head group on a nanostructure surface. A ligand can incorporate reactive head groups including, but not limited to, dithiophosphates, phosphates, carboxylates, amines, thiols and nitro groups that can bind to the surface of a nanostructure. It should be understood, however, that the head groups are not limited to those specifically mentioned and that any binding methodology may be utilized to bind a head group of a ligand to a nanostructure, as is known to one of skill in the art.

Ligands can also include a terminal group including a reactive functionality for crosslinking an omnino nanocomposite network. In addition to this reactive functionality, a terminal group can provide additional characteristics to composite nanostructures and/or the crosslinked networks formed from the composite nanostructures. For instance, a ligand can include a group that describes a high thermal decomposition temperature, and the resulting omnino composite network can exhibit good thermal stability.

In one embodiment, a ligand can provide dispersibility and/or solubility to the composite nanoparticles. For example, a hydrophilic ligand can be bound to a core nanostructure and can improve the solubility/dispersibility of the composite nanostructures in water. Similarly, a ligand can be selected so as to improve the solubility of composite nanostructures in an organic solvent, for instance in those embodiments in which the crosslinking of the network desirably takes place in an organic solvent.

Other characteristics that a ligand, e.g. a ligand terminal group, can provide to the composite nanostructures and/or the crosslinked omnino nanocomposite network can include, for example, mechanical characteristics such as modulus, strength, elasticity, flexibility, resistance to degradation, and the like. Exemplary terminal groups can include, without limitation, acrylates, methacrylates, vinyl groups, styrenes, and so forth. Specific ligands for use as disclosed herein can include, without limitation, 4-vinlbenzoic acid, acrylic acid, methacrylic acid, and so forth.

In one preferred embodiment, fluorocarbon-based ligands can be utilized. Fluorocarbons can provide desirable properties, such as low transmission loss (at 1300 and 1550 nm), low birefringence, good optical stability after thermal aging, and low moisture absorption.

In one application, a composite nanostructure can be provided that includes ligands including a trifluorovinyl aromatic ether (TFVE) terminal group. For example, in one embodiment, a TFVE acid ligand can be utilized including a TFVE terminal group and a carboxyl head group.

Trifluorovinyl aromatic ether monomer ligands can be prepared in two high yielding steps from commercially available phenolic precursors such as, for example, tris(hydroxyphenyl)ethane, bisphenol, bishydroxyphenyl fluorine, or other compounds. Partially inorganic monomers containing, e.g., siloxane and phosphine oxide groups have also been synthesized using an intermediate strategy involving delivery of a TFVE group intact via Grignard and organo-lithium chemistry. Thus, according to one embodiment, TFVE-based ligands can be utilized that can include a variety of structures in the body of the ligands so as to provide desired characteristics to nanocomposite materials and/or the crosslinked omnino nanocomposite networks formed from the individual nanocomposites. Exemplary TFVE acid ligands can include, without limitation, those illustrated in Table 1, below:

TABLE 1

TVFE acid ligand

TABLE 1-continued

TVFE acid ligand

Other head groups can be utilized as well when considering TVFE terminated ligands. For instance, TVFE-containing ligands can include phosphonate, dithiophosphonate, amine, nitro, or any other suitable head groups.

Following formation of composite nanostructures, each nanostructure can have hundreds or even thousands of ligands attached hereto. In one embodiment, the attached ligands can form essentially a monolayer surrounding each nanoparticle.

Ligands of composite nanostructures including reactive terminal groups can be directly or indirectly crosslinked to form an omnino nanocomposite crosslinked network. Crosslinking of the nanocomposite particles may be initiated by any method as is known in the art including addition of heat, by photo-initiation or by free radical cross-linking. However, methods of crosslinking which do not produce large amounts of unwanted by-products or condensates can be preferred as these will be more easily processed in a bulk phase. Any suitable crosslink protocol may be utilized, and can generally depend upon the specific characteristics of the terminal groups involved. For example, terminal groups can react with one another to crosslink the network. In one embodiment, terminal groups that react to form crosslinks can be identical to one another, but this is not a requirement, and in other embodiments different ligands including different terminal groups can be bound to the core nanostructures. According to this embodiment, reaction between two different terminal groups can be utilized to crosslink the network.

Figure 1:
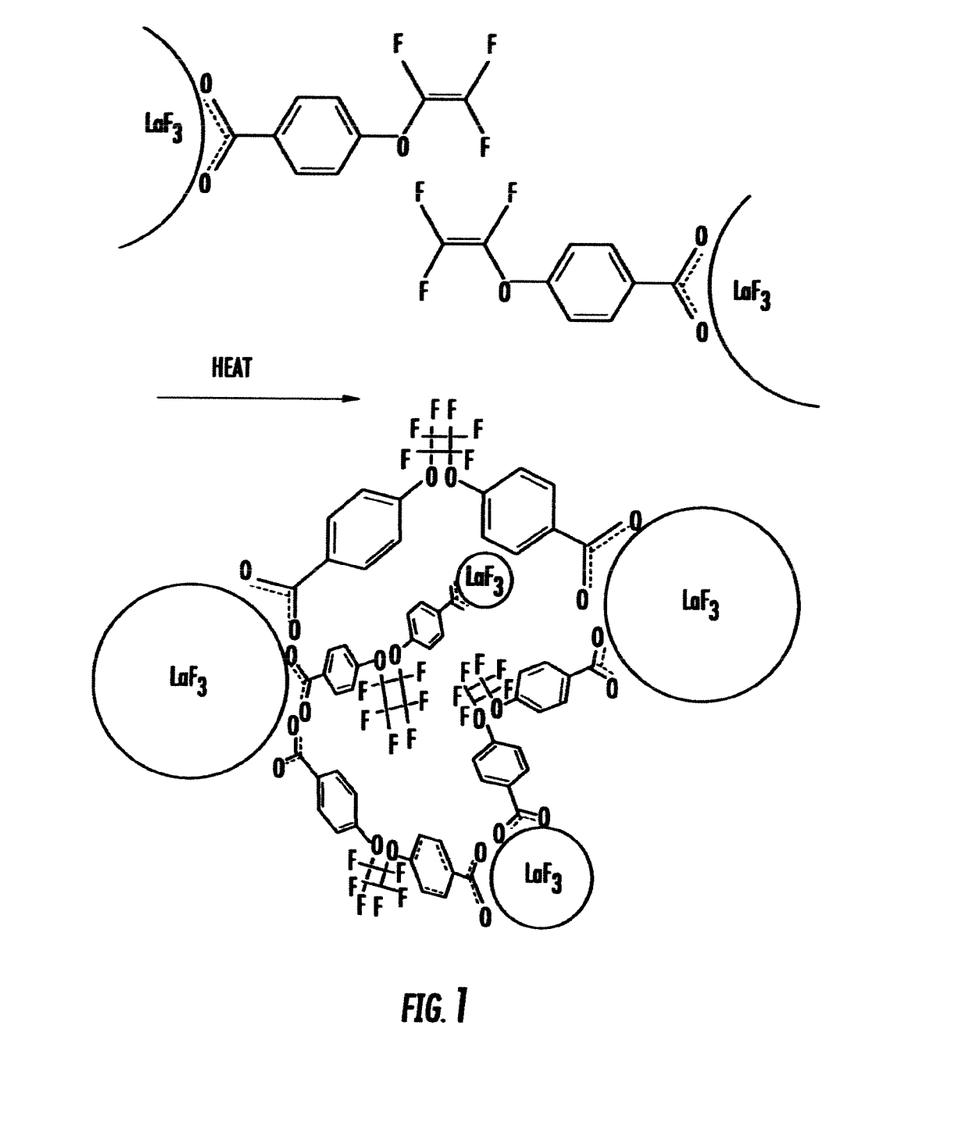
FIG. 1 illustrates one embodiment of disclosed formation methods including crosslinking of trifluorovinyl ether (TFVE) ligands bound to lanthanum fluoride ($LaF_3$) nanoparticles.

FIG. 1 illustrates one embodiment of a formation method as disclosed herein. With reference to FIG. 1, a nanoparticle, e.g., a rare earth doped lanthanum fluoride particle, can be functionalized with a TVFE acid ligand. Specifically, upon deprotonation of the acid group, the resulting carboxyl groups can bind the La3+ atoms of the particles, as shown. Upon addition of heat, terminal TVFE groups of the ligands can react with one another via a free radical mediated thermal mechanism to form a perfluorocyclobutyl (PFCB) linkage, as illustrated.

Direct crosslinking between terminal groups of ligands is not a requirement of disclosed formation methods, and in other embodiments, bifunctional small molecule crosslinkers can be utilized to indirectly crosslink terminal groups of ligands. For instance, bifunctional crosslinkers having identical reactive ends such as bis(sulfosuccinimidyl)suberate, disuccinimidyl tartrate and disulfosuccinimidyl tartrate can be utilized. Bifunctional cross-linkers having different reactive ends can also be utilized. For instance, m-maleimidobenzoyl-N-hydroxysuccinimide ester, [N-(E maleimidocaproyloxy)-succinimide] can be utilized. Photoreactive crosslinkers as may be utilized can include p-azidobenzoyl hydrazide, 4-(p-azidosalicylamido) butylamine and N-hydroxysuccinimidyl-4-azidosalicylic acid. As is known in the art, preferred crosslinkers can depend upon the specific terminal groups of ligands involved. For instance, primary amine reactive cross-linkers can include, without limitation, imidoester and N-hydroxysuccinimide-esters; sulfhydryl reactive cross-linkers can include maleimides, haloacetyls and pyridyl disulfides; and carbonyl reactive cross-linkers can include hydrazides and carbodiimides.

In addition, it should be understood that a two-step network formation process is not a requirement of the disclosed subject matter. In other embodiments a single step process can be utilized. For instance, a bifunctional ligand, for instance a dicarboxylic acid or a bisamino ligand, may be utilized in which both the head group and the terminal group of a ligand can bind to the nanostructures of the composite. Accordingly, a formation process can be utilized in which a single ligand can bind two nanostructures, thus forming the disclosed crosslinked network in a single step process.

As the nanocomposites can be functionalized to include a large number of ligands including reactive terminal groups, the formed omnino composite networks can be highly crosslinked. Optionally, however, a smaller number of reactive ligands can be bound to a nanostructure and an omnino composite crosslinked network can be formed having a proportionally lower crosslink density. For instance, a blend of ligands can be bound to a nanostructure. The blend of ligands can include active ligands incorporating reactive terminal groups that can react and crosslink the omnino nanocomposite network. The blend can also include passive ligands (e.g., benzoic acid, phenylphosphonic acid, etc.) incorporating nonreactive terminal groups that, following attachment to the core nanostructure, will not react during crosslinking of the network, but can be held in the formed composite via attachment of the ligands to nanoparticles at the ligand head groups.

Omnino nanocomposite networks can exhibit many advantages over traditional bulk nanocomposite materials incorporating a polymer matrix. For instance, chemically and mechanical stability of disclosed networks can be greater than previously known polymeric nanocomposites. By way of example, disclosed omnino nanocomposites can be less soluble and harder as compared to traditional nanocomposites that incorporate a polymer in the matrix.

Optical properties of omnino nanocomposites can exceed those of traditional polymeric composite matrices. For instance, the range of the transmission window of disclosed omnino nanocomposites can exceed those of traditional nanocomposite incorporating the same optically active nanostructures in a polymeric matrix. In addition, variation in refractive index throughout the formed bulk material can be reduced. Moreover, as agglomeration of the nanostructures can be eliminated, associated optical scattering can likewise be eliminated. Higher loading level of optically active materials in disclosed omnino nanocomposites and elimination of polymers in the composite can provide for improved transparency of the bulk material in the UV, visible, and/or IR spectrums along with improved emission intensity. For example, emission intensity of disclosed omnino nanocomposite bulk materials can be about 8 times higher than a traditional nanocomposite incorporating the same optically active nanostructures.

The disclosed subject matter may be better understood with reference to the example, set forth below.

EXAMPLE

Lanthanum fluoride LaF3 nanoparticles doped with Europium (Eu) were functionalized to include trifluorvinyl ether (TFVE) ligands at the surface.

0.9 mmol TFVE acid and 3.0 mmol NaF were dissolved in 35 ml H2O at 75° C. The pH of the solution was adjusted to 10.6 with NaOH.

A total of 1.33 mmol of La(NO3)3 and Eu(NO3)3 were added to this solution dropwise. The La and Eu ions were added in the desired stoichiometry of the nanoparticles. The resulting solution was stirred for 2 hours and cleaned twice in H2O and ethanol followed by dispersion in dichloromethane (DCM) and precipitated with ethanol. The formed functionalized particles were allowed to dry for two days in a desiccator over phosphorous pentoxide (P2O5). The synthesized particles were easily dispersed in tetrahydrofuran (THF) when sonicated.

Nanoparticles with diameter between 5 and 10 nanometers were formed as determined by transmission electron microscopy (not shown). A significant shift (1678 cm-1 to 1548 cm-1) in the peak associated with the vibrations of the TFVE acid's carboxyl group was observed with FTIR. This shift is indicative of the La3+ atoms binding to the carboxyl and reducing the vibrational energy.

Four different loading levels of the functionalized nanoparticles in hexafluoroisopropylidene (6F) derivative PFCB monomer were prepared, i.e., 100% (corresponding to no monomer in solution, and formation of omnino nanocomposites), 44%, 22%, and 0% (corresponding to pure polymer).

Polymerization was carried out by heating for 16 hours at 150° C. under argon. The temperature was then increased to 180° C. for another 16 hours and then cooled over 3 hours to room temperature.

The degree of crosslinking was investigated by measuring the solubility and swelling of the nanocomposites. Two solvents were employed, THF and DCM. Only the pure 6F-PFCB polymer matrix was soluble in solvent (THF and DCM) and only the 22% nanoparticle composite swelled.

Following 20 minutes in THF, the 22% composite was found to have gained 66% of its initial weight (9.5 mg to 15.8 mg), and after 5 hours, it had gained 100% of its initial weight. The 44% nanoparticle composite and the omnino nanocomposite were not soluble in either solvent and did not exhibit any detectable swelling over a period of days.

Figure 2:
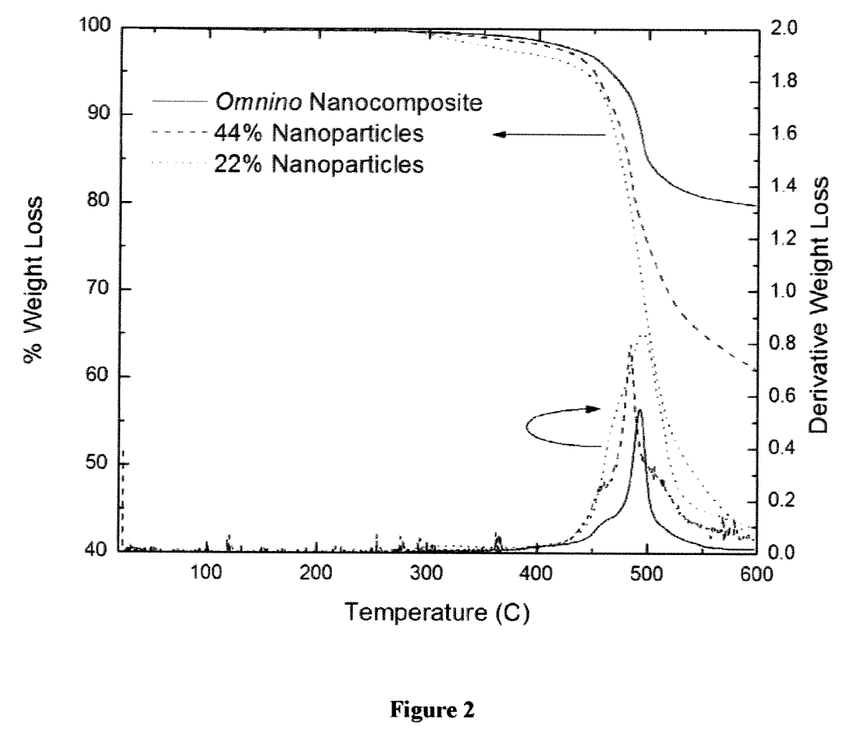

Thermogravimetric analysis (TGA) was performed to determine what percent of the nanoparticles was ligand and also to determine the onset of thermal degradation. Results are shown in FIG. 2. As can be seen, the omnino nanocomposite, traditional nanocomposites (22% and 44% functionalized nanoparticles), and the 100% crosslinked polymer all had similar thermal stability with the onset of degradation occurring at approximately 300° C. and the degradation rapidly accelerating at 450° C. It was also determined from TGA that the pure nanoparticles were composed of approximately 20 wt % ligand. This indicates that the omnino nanocomposite reached a loading level of approximately 80% of the optically active material (Eu3+ doped LaF3).

Figure 3:
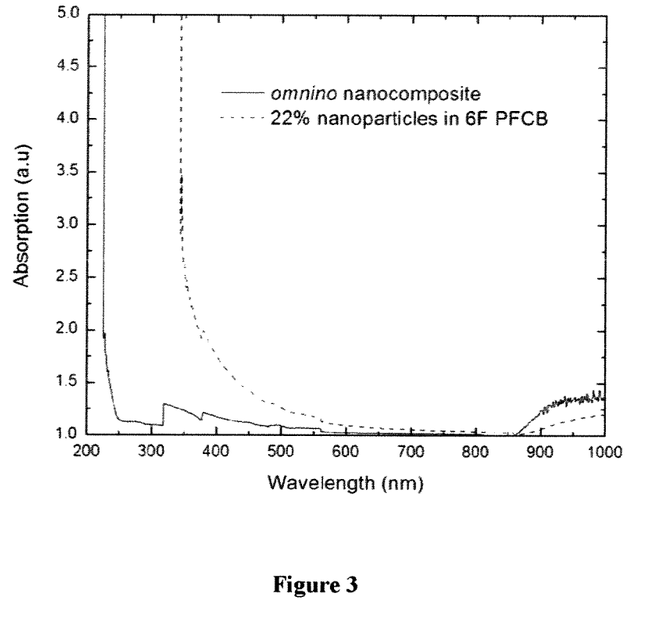
FIG. 3 compares the transmission spectra of omnino nanocomposites as disclosed herein with traditional crosslinked polymer networks.

The nanocomposites were optically transparent with some slight discoloration believed to be due to inadequate degassing of the nanoparticles and monomer. The transmission spectra (FIG. 3) showed that the omnino nanocomposite had significantly lower absorptions in the UV. This is expected due to the high concentration of LaF3 in the bulk material. This shift is predicted by using a weighted average of the materials composition and the electron absorption tail.

Figure 4:
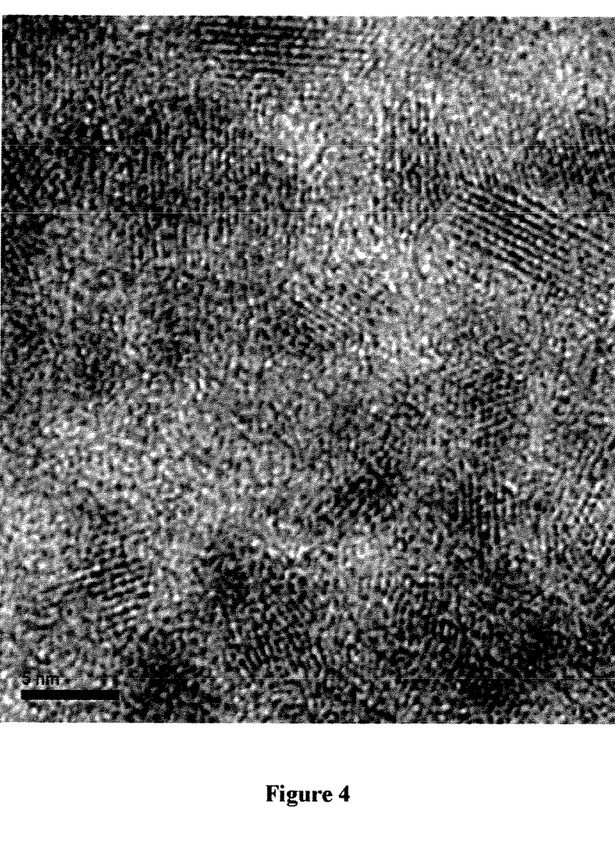
FIG. 4 is a high resolution transmission electron microscopy image of one embodiment of omnino nanocomposites as described herein.

The increased loading levels can be seen spatially in the high resolution TEM imaging of the cross sections of the omnino nanocomposite in FIG. 4.

It will be appreciated that the foregoing examples, given for purposes of illustration, are not to be construed as limiting the scope of this disclosure. Although only a few exemplary embodiments have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the presently disclosed subject matter.

What is claimed is:

1. A bulk nanocomposite consisting essentially of a plurality of optically active inorganic nanostructures, each optically active inorganic nanostructure including an optically active rare earth ion dopant, each optically active inorganic nanostructure of the bulk nanocomposite being linked to at least one other optically active inorganic nanostructure with a linking structure which consists of a first ligand and a second ligand, each ligand having less than about 20 repeating monomer units.

2. The bulk nanocomposite according to claim 1, wherein all of the optically active inorganic nanostructures of the bulk nanocomposite consist of the same rare earth ion dopant.

3. The bulk nanocomposite according to claim 1, wherein different optically active inorganic nanostructures of the bulk nanocomposite further comprise different rare earth ion dopants.

4. The bulk nanocomposite according to claim 1, wherein the optically active inorganic nanostructures further comprise core/shell nanostructures.

5. The bulk nanocomposite according to claim 4, the core/shall nanostructures consist of multiple layers including a first rare earth ion dopant within a first layer and a second rare earth ion dopant within a second layer.

6. The bulk nanocomposite according to claim 1, wherein the bulk nanocomposite further comprises greater than about 50% by weight nanostructures.

7. The bulk nanocomposite according to claim 1, wherein the optically active nanostructures further comprises a semiconductor.

8. A bulk nanocomposite consisting essentially of a plurality of optically active inorganic nanostructures, each optically active inorganic nanostructure including an optically active rare earth ion dopant, each optically active inorganic nanostructure of the bulk nanocomposite being linked to at least one other optically active inorganic nanostructure with a linking structure which consists of a single ligand having less than about 10 monomer units.

9. The bulk nanocomposite according to claim 8 wherein the bulk nanocomposite comprises greater than about 50% by weight nanostructures.

* * * * *